US010552089B2

(12) United States Patent
Shan et al.

(10) Patent No.: US 10,552,089 B2
(45) Date of Patent: Feb. 4, 2020

(54) DATA PROCESSING FOR MANAGING LOCAL AND DISTRIBUTED STORAGE SYSTEMS BY SCHEDULING INFORMATION CORRESPONDING TO DATA WRITE REQUESTS (71) Applicant: Huawei Technologies Co., Ltd., Shenzhen (CN)

(72) Inventors: Weihua Shan, Xi'an (CN); Jia Li, Xi'an (CN); Yang Dong, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/102,281

(22) Filed: Aug. 13, 2018

(65) Prior Publication Data
US 2018/0364948 A1 Dec. 20, 2018

Related U.S. Application Data (63) Continuation of application No. PCT/CN2016/105944, filed on Nov. 15, 2016.

(30) Foreign Application Priority Data

May 24, 2016 (CN) .......................... 2016 1 0348463

(51) Int. Cl.
*G06F 3/06* (2006.01)
(52) U.S. Cl.
CPC ............ *G06F 3/0659* (2013.01); *G06F 3/061* (2013.01); *G06F 3/0604* (2013.01); *G06F 3/065* (2013.01);
(Continued)

(58) Field of Classification Search
CPC ................................ G06F 3/0659; G06F 3/061
See application file for complete search history.

(56) References Cited

U.S. PATENT DOCUMENTS 10,148,753 B2 * 12/2018 Luo ........................ H04L 12/185
10,168,953 B1 * 1/2019 Gupta ................... G06F 3/0659
(Continued)

FOREIGN PATENT DOCUMENTS

| CN | 102629221 A | 8/2012 |
| CN | 102841759 A | 12/2012 |
| CN | 103455577 A | 12/2013 |

OTHER PUBLICATIONS

Machine Translation and Abstract of Chinese Publication No. CN102841759, Dec. 26, 2012, 12 pages.
(Continued)

*Primary Examiner* — Tammara R Peyton
(74) *Attorney, Agent, or Firm* — Conley Rose, P.C.

(57) ABSTRACT

A data processing method to improve data storage flexibility includes receiving, by a first storage management device, a data write request generated by a host, where the host is provided with the first storage management device, determining, by the first storage management device according to the data write request, scheduling information corresponding to the data write request, where the data write request includes to-be-written data, and the scheduling information corresponding to the data write request indicates a distributed storage pool, or a local storage device of the host, and processing, by the first storage management device, the to-be-written data according to the scheduling information corresponding to the data write request.

20 Claims, 5 Drawing Sheets (52) U.S. Cl.
CPC ............ *G06F 3/067* (2013.01); *G06F 3/0644* (2013.01); *G06F 3/0685* (2013.01)

(56) References Cited

U.S. PATENT DOCUMENTS

| | | |
|---|---|---|
| 2014/0373026 A1 | 12/2014 | Gu et al. |
| 2016/0062788 A1 | 3/2016 | Brant et al. |
| 2016/0373377 A1* | 12/2016 | Cao .................... G06F 9/5088 |
| 2017/0031816 A1* | 2/2017 | Lee ..................... G06F 3/061 |

OTHER PUBLICATIONS

Machine Translation and Abstract of Chinese Publication No. CN103455577, Dec. 18, 2013, 11 pages.
Foreign Communication From a Counterpart Application, PCT Application No. PCT/CN2016/105944, English Translation of International Search Report dated Mar. 8, 2017, 2 pages.

* cited by examiner

DATA PROCESSING FOR MANAGING LOCAL AND DISTRIBUTED STORAGE SYSTEMS BY SCHEDULING INFORMATION CORRESPONDING TO DATA WRITE REQUESTS

CROSS-REFERENCE TO RELATED APPLICATIONS

This application is a continuation of International Patent Application No. PCT/CN2016/105944 filed on Nov. 15, 2016, which claims priority to Chinese Patent Application No. 201610348463.6 filed on May 24, 2016. The disclosures of the aforementioned applications are hereby incorporated by reference in their entireties.

TECHNICAL FIELD

The present disclosure relates to the computer field, and in particular, to a data processing method, a related device, and a storage system.

BACKGROUND

With rapid development of information technologies, data is increasing exponentially, and currently has entered an era of massive data. A conventional data storage manner cannot meet a current storage situation. Big data cloudification provides a solution for massive data storage. Currently, a cloud storage technology develops rapidly at home and abroad, and there are some relatively representative storage technologies, such as a HADOOP distributed file system (HDFS) and AMAZON S3. For HDFS storage, in a cluster file system including a computer network and a node, a file fragment is distributed to each node, and data node storage is supported. A client accesses remote storage using a network connection, and if there is a high requirement for read/write operations per second (or input/output operations per second (I/OPS)), performance is relatively poor. AMAZON S3 storage is external storage, a throughput is relatively high, and performance is relatively poor in an application scenario of big data.

In a common method, because each storage technology has a respective storage architecture, data processing is not flexible, and adaptability is relatively poor in different corresponding application scenarios.

SUMMARY

Embodiments of the present disclosure provide a data processing method, a related device, and a storage management device, to support a plurality of application scenarios, to support high adaptability, and to improve data storage flexibility.

According to a first aspect, an embodiment of the present disclosure provides a data processing method, and the method is applied to a storage system. The storage system includes a plurality of hosts, and each host is provided with a local storage device, a distributed storage device, and a storage management device. A storage medium of each host may be divided into two parts. One part may be a local storage device of the host, and the other part may be a distributed storage device. The distributed storage device of each host is configured to form a distributed storage pool shared by the hosts. A first host is one of the plurality of hosts, and a first storage management device is a storage management device disposed in the first host. In this case, the data processing method includes receiving, by the first storage management device, a data write request generated by the first host, where the first host may include a first virtual machine, and the first storage management device may also receive a data write request from the first virtual machine, determining, by the first storage management device according to the data write request, scheduling information corresponding to the data write request, where the data write request includes to-be-written data, the scheduling information is used to indicate a storage resource of the to-be-written data, the storage resource may be understood as a storage location of the to-be-written data, and the scheduling information may indicate that the storage location of the to-be-written data is the distributed storage pool, or a local storage device of the first host, and processing, by the first storage management device, the to-be-written data according to the scheduling information corresponding to the data write request, where processing the to-be-written data includes storing the to-be-written data into the local storage device of the first host and/or the distributed storage pool.

In this embodiment of the present disclosure, the scheduling information may indicate that the storage location of the to-be-written data is the local storage device and/or the distributed storage pool, and the storage management device determines the scheduling information corresponding to the data write request, and may process the to-be-written data according to the scheduling information. Therefore, storage flexibility of the to-be-written data is greatly improved such that the present disclosure can be more flexibly applied to a plurality of application scenarios.

In a possible implementation, a plurality of different types of logical volumes are mounted onto the first host or the first virtual machine of the first host. The first storage management device manages the plurality of types of logical volumes, and the plurality of types of logical volumes include a local storage volume and a distributed storage volume. The first storage management device further stores scheduling information corresponding to each type of logical volume. Scheduling information corresponding to the local storage volume indicates that the storage resource of the to-be-written data is the local storage device of the first host, and scheduling information corresponding to the distributed storage volume indicates that the storage resource of the to-be-written data is the distributed storage pool. Determining, by the first storage management device, scheduling information corresponding to the data write request may include determining, by the first storage management device, a logical volume corresponding to the data write request, and then obtaining scheduling information corresponding to the logical volume corresponding to the data write request.

In this embodiment of the present disclosure, because the plurality of types of logical volumes are mounted onto the virtual machine, the first storage management device may perform corresponding processing on the to-be-written data according to scheduling information corresponding to different types of logical volumes. Therefore, the present disclosure can be more flexibly applied to a plurality of application scenarios, such as a desktop cloud scenario and a big data scenario. Big data may be data accumulated by an enterprise, data generated by a social medium, or data collected by a sensing device. Because of a large data amount, the big data is more suitable for being stored in a local storage area. In comparison with distributed storage and external storage, network overheads are greatly reduced in order to meet a requirement for a high throughput of the big data, to reduce a delay, and to improve data processing efficiency. Therefore, the local storage volume may be used as a data storage volume. In the desktop cloud scenario, a high I/OPS requirement of desktop cloud is met such that data is more suitable for distributed storage. Therefore, the distributed storage volume may be used as an operating system volume. In this way, not only a high I/OPS requirement can be met, but requirements for a high throughput and for saving a network resource can be met.

In another possible implementation, the plurality of types of logical volumes may further include a hybrid storage volume, and scheduling information corresponding to the hybrid storage volume indicates that the storage resource of the to-be-written data is the local storage device of the first host and the distributed storage pool. Scheduling information is further used to indicate a quantity of copies of the to-be-written data. A quantity of copies that is indicated by the scheduling information corresponding to the local storage volume is a quantity of first copies, a quantity of copies that is indicated by the scheduling information corresponding to the distributed storage volume is a quantity of second copies, a quantity of copies that is indicated by the scheduling information corresponding to the hybrid storage volume is a quantity of third copies, and the quantity of third copies is an integer greater than or equal to 2. A specific method for processing the to-be-written data by the first storage management device according to the scheduling information corresponding to the data write request may include that if the scheduling information corresponding to the data write request indicates that the storage resource is the local storage device of the first host, storing, by the first storage management device, a copy that is of the to-be-written data and whose quantity is the quantity of first copies into the local storage device of the first host, if the scheduling information corresponding to the data write request indicates the distributed storage pool, storing, by the first storage management device, a copy that is of the to-be-written data and whose quantity is the quantity of second copies into the distributed storage pool, and if the scheduling information corresponding to the data write request indicates the local storage device of the first host and the distributed storage pool, storing, by the first storage management device, one copy of the to-be-written data into the local storage device of the first host, and storing N copies of the to-be-written data into the distributed storage pool, where N is obtained by subtracting 1 from the quantity of third copies, and N is a positive integer.

In another possible implementation, the data write request further carries a data amount of the to-be-written data.

A specific method for determining the logical volume corresponding to the data write request by the first storage management device may include determining, by the first storage management device according to the data amount of the to-be-written data, the logical volume corresponding to the data write request, and when the data amount of the to-be-written data is less than or equal to a first threshold, determining, by the first storage management device according to the data amount, that a type of the volume is the distributed storage volume, when the data amount is greater than the first threshold and is less than or equal to a second threshold, determining, by the first storage management device according to the data amount, that the type of the volume is the hybrid storage volume, and when the data amount is greater than the second threshold, determining, by the storage management device according to the data amount, that the type of the logical volume is the local storage volume.

In this embodiment of the present disclosure, the first storage management device dynamically determines the type of the logical volume according to the data amount of the to-be-written data such that the type of the logical volume can be dynamically determined according to features of different application scenarios, thereby enhancing adaptability and practicability.

In another possible implementation, the first storage management device may further obtain load information of the local storage device of the first host and load information of the distributed storage pool. The load information is information such as an amount of data stored in the local storage device and the distributed storage pool and a data distribution status. A specific method for determining different types of logical volumes corresponding to the data write request by the first storage management device may include obtaining, by the first storage management device, the load information of the local storage device of the first host and the load information of the distributed storage pool according to the received data write request, and determining, by the first storage management device according to the load information of the local storage device of the first host and the load information of the distributed storage pool, the logical volume corresponding to the data write request.

In this embodiment of the present disclosure, a volume type can be flexibly determined according to load information of a storage resource, that is, a storage resource of data can be flexibly determined such that data storage flexibility is greatly improved.

In another possible implementation, the data write request further carries volume information corresponding to the to-be-written data, and determining, by the first storage management device, a logical volume corresponding to the data write request includes determining, by the first storage management device according to the volume information corresponding to the to-be-written data, the logical volume corresponding to the data write request. A reserved field and a newly added field of the data write request may carry the volume information, and the volume information is used to indicate a type of the logical volume. The volume information may be meta information of a volume, and the meta information is description information of different types of logical volumes. The volume information may be a logical address of the different types of logical volumes, or may be an index corresponding to the different types of logical volumes.

In another possible implementation, the data write request further carries a data amount of the to-be-written data. A specific method for determining the scheduling information corresponding to the data write request by the first storage management device may include determining, by the first storage management device according to the data amount of the to-be-written data, the scheduling information corresponding to the data write request. When the data amount is less than or equal to a first threshold, the scheduling information determined by the storage management device according to the data amount of the to-be-written data includes that the corresponding storage resource is the local storage device, when the data amount is greater than the first threshold and is less than or equal to a second threshold, the scheduling information determined by the storage management device according to the data amount includes that the corresponding copy quantity is three, and the corresponding storage resource is the distributed storage pool, and when the data amount is greater than the second threshold, the scheduling information determined by the storage management device according to the data amount is the local storage device and the distributed storage pool.

In another possible implementation, the first storage management device further obtains load information of the local storage device of the first host and load information of the distributed storage pool. A specific method for determining the scheduling information corresponding to the data write request by the first storage management device may include determining, by the first storage management device according to the load information of the local storage device of the first host and the load information of the distributed storage pool, the scheduling information corresponding to the data write request.

In this embodiment of the present disclosure, the scheduling information may indicate that the storage location of the to-be-written data is the local storage device and/or the distributed storage pool, and the storage management device dynamically determines the scheduling information corresponding to the data write request, and may process the to-be-written data according to the scheduling information. Therefore, storage flexibility of the to-be-written data is greatly improved such that the present disclosure can be more flexibly applied to a plurality of application scenarios.

In another possible implementation, the scheduling information corresponding to the data write request further includes a quantity of fourth copies of the to-be-written data, and the quantity of fourth copies is an integer greater than or equal to 2, and if the scheduling information corresponding to the data write request indicates that the storage resource of the to-be-written data is the local storage device of the first host, the first storage management device stores a copy that is of the to-be-written data and whose quantity is the quantity of fourth copies into the local storage device of the first host, if the scheduling information corresponding to the data write request indicates that the storage resource of the to-be-written data is the distributed storage pool, the first storage management device stores a copy that is of the to-be-written data and whose quantity is the quantity of fourth copies into the distributed storage pool, and if the scheduling information corresponding to the data write request indicates that the storage resource of the to-be-written data is the local storage device of the first host and the distributed storage pool, the first storage management device stores one copy of the to-be-written data into the local storage device of the first host, and stores M copies of the to-be-written data into the distributed storage pool, where M is obtained by subtracting 1 from the quantity of fourth copies, and M is a positive integer. In this embodiment of the present disclosure, to ensure security of the to-be-written data, the scheduling information is further used to indicate a quantity of copies of the to-be-written data, and the quantity of copies can be flexibly set according to a specific actual application situation, thereby enhancing use performance.

According to a second aspect, an embodiment of the present disclosure provides a storage management device with a function actually executed by the storage management device in the first aspect. The function may be implemented using hardware, or may be implemented by executing corresponding software by hardware. The hardware or the software includes one or more modules corresponding to the foregoing function.

According to a third aspect, an embodiment of the present disclosure provides a host, including a processor, a local storage device, a distributed storage device, a memory, and a bus. The processor, the local storage device, the distributed storage device, and the memory are connected using the bus. The distributed storage device and a distributed storage device of another host are configured to form a distributed storage pool shared by the host and the other host, and the memory is configured to store a program instruction. The processor executes the program instruction in order to perform the following steps of receiving a data write request, determining, according to the data write request, scheduling information corresponding to the data write request, where the data write request includes to-be-written data, and the scheduling information corresponding to the data write request indicates the distributed storage pool or the local storage device, and processing the to-be-written data according to the scheduling information corresponding to the data write request.

In a possible implementation, the host manages a plurality of types of logical volumes, the plurality of types of logical volumes include a local storage volume and a distributed storage volume, the host further stores scheduling information corresponding to each type of logical volume, scheduling information corresponding to the local storage volume indicates the local storage device, and scheduling information corresponding to the distributed storage volume indicates the distributed storage pool, and determining scheduling information corresponding to the data write request may include determining a logical volume corresponding to the data write request, and obtaining scheduling information corresponding to the logical volume corresponding to the data write request.

In a possible implementation, the plurality of types of logical volumes further include a hybrid storage volume, scheduling information corresponding to the hybrid storage volume indicates the local storage device and the distributed storage pool, the scheduling information corresponding to the local storage volume further includes a quantity of first copies, the scheduling information corresponding to the distributed storage volume further includes a quantity of second copies, the scheduling information corresponding to the hybrid storage volume further includes a quantity of third copies, and the quantity of third copies is an integer greater than or equal to 2, and processing the to-be-written data according to the scheduling information corresponding to the data write request may include, if the scheduling information corresponding to the data write request indicates the local storage device, storing a copy that is of the to-be-written data and whose quantity is the quantity of first copies into the local storage device, if the scheduling information corresponding to the data write request indicates the distributed storage pool, storing a copy that is of the to-be-written data and whose quantity is the quantity of second copies into the distributed storage pool, and if the scheduling information corresponding to the data write request indicates the local storage device and the distributed storage pool, storing one copy of the to-be-written data into the local storage device, and storing N copies of the to-be-written data into the distributed storage pool, where N is obtained by subtracting 1 from the quantity of third copies, and N is a positive integer.

In a possible implementation, the data write request further carries a data amount of the to-be-written data, and determining a logical volume corresponding to the data write request may include determining, according to the data amount of the to-be-written data, the logical volume corresponding to the data write request.

In a possible implementation, the processor is further configured to obtain load information of the local storage device and load information of the distributed storage pool, and determining a logical volume corresponding to the data write request may include determining, according to the load information of the local storage device and the load information of the distributed storage pool, the logical volume corresponding to the data write request.

In a possible implementation, the data write request further carries a data amount of the to-be-written data, and determining scheduling information corresponding to the data write request may include determining, according to the data amount of the to-be-written data, the scheduling information corresponding to the data write request.

In a possible implementation, the processor is further configured to obtain load information of the local storage device and load information of the distributed storage pool, and a method for determining the scheduling information corresponding to the data write request may include determining, according to the load information of the local storage device and the load information of the distributed storage pool, the scheduling information corresponding to the data write request.

In a possible implementation, the scheduling information corresponding to the data write request further includes a quantity of fourth copies of the to-be-written data, and the quantity of fourth copies is an integer greater than or equal to 2, and if the scheduling information corresponding to the data write request indicates the local storage device, a copy that is of the to-be-written data and whose quantity is the quantity of fourth copies is stored into the local storage device, if the scheduling information corresponding to the data write request indicates the distributed storage pool, a copy that is of the to-be-written data and whose quantity is the quantity of fourth copies is stored into the distributed storage pool, if the scheduling information corresponding to the data write request indicates the local storage device and the distributed storage pool, one copy of the to-be-written data is stored into the local storage device, and M copies of the to-be-written data is stored into the distributed storage pool, where M is obtained by subtracting 1 from the quantity of fourth copies, and M is a positive integer.

According to a fourth aspect, an embodiment of the present disclosure provides a storage medium, the storage medium stores program code, and when the program code is run by the host in the third aspect, the data processing method provided in the first aspect or any implementation of the first aspect is performed. The storage medium includes but is not limited to a flash memory, a hard disk drive (HDD), or a solid state drive (SSD).

According to a fifth aspect, an embodiment of the present disclosure provides a storage system, the system includes a plurality of hosts according to the third aspect or any implementation of the third aspect, and the hosts establish a communication connection with each other.

DESCRIPTION OF EMBODIMENTS

Embodiments of the present disclosure provide a data scheduling method and a storage management device in order to improve flexibility and adaptability of a data operation.

To make persons skilled in the art understand the technical solutions in the present disclosure better, the following describes the technical solutions in the embodiments of the present disclosure with reference to the accompanying drawings in the embodiments of the present disclosure.

In the specification, claims, and accompanying drawings of the present disclosure, the terms "first," "second," "third," "fourth," and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include," "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

An embodiment of the present disclosure provides a data processing method, and the method is applied to a storage system. Referring to a schematic diagram of a storage system 100 shown in FIG. 1, the storage system 100 includes a plurality of hosts 110, each host 110 is provided with a local storage device 120, a distributed storage device 130, and a storage management device 140, and the distributed storage device 130 of each host 110 is configured to form a distributed storage pool 150 shared by the hosts. The storage management device 140 may receive a data processing request generated by the host 110. The storage management device 140 determines scheduling information according to the data processing request, and the scheduling information is used to indicate the local storage device 130 and the distributed storage pool 150. The storage management device 140 performs corresponding processing on to-be-written data according to the scheduling information.

Figure 1:
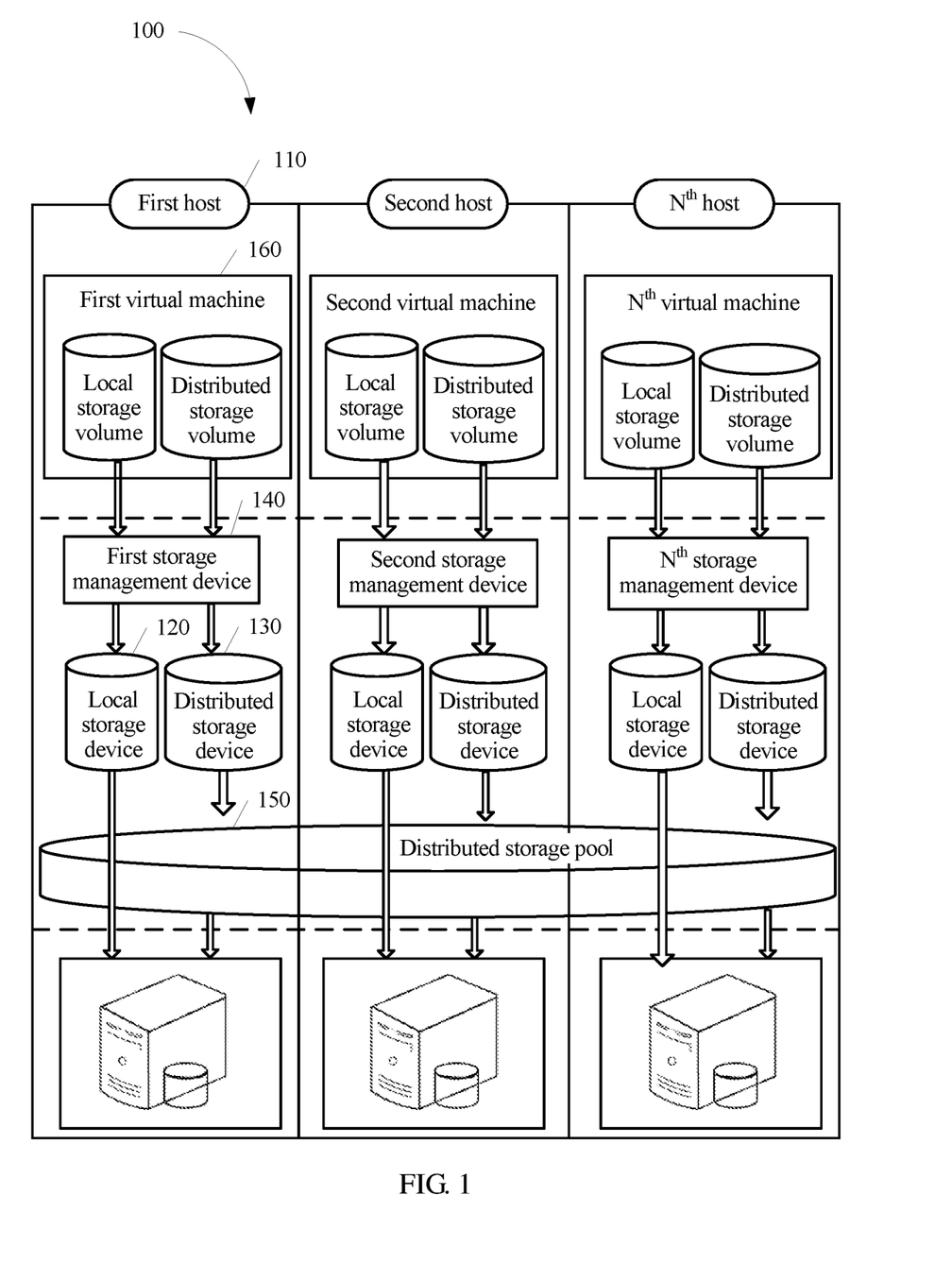
FIG. 1 is a schematic diagram of a storage system according to an embodiment of the present disclosure.

The storage management device 140 may be a software entity that runs on each host 110, such as FUSIONSTORAGE. When the host 110 runs, the storage management device 140 is implemented. The local storage device 120 and the distributed storage device 130 may be understood as a storage medium in the host 110. For example, the storage medium is divided into two parts, and the storage medium includes an SSD, a disk, and the like. The storage medium herein is described using a disk as an example. One part is the local storage device, and the other part is the distributed storage device. For example, the host 110 includes three physical disks, a first disk, a second disk, and a third disk. The local storage device includes the first disk and "one third of the second disk", and the distributed storage device includes the third disk and "two thirds of the second disk". Alternatively, the local storage device 120 and the distributed storage device 130 may be independent storage devices. For example, the local storage device is the first disk, and the distributed storage device 130 is the second disk. It should be noted that the foregoing is merely an example description of the local storage device and the distributed storage device, but is not a restrictive description. In actual application, this is not limited in the present disclosure.

A plurality of types of logical volumes are mounted onto each host 110. The storage management device 140 manages the plurality of types of logical volumes. Optionally, the host 110 may further include W virtual machines 160, and W is a positive integer. The W virtual machines 160 are implemented in the host 110 using a virtualization technology. The plurality of types of logical volumes may be alternatively mounted onto a virtual machine. In actual application, whether the virtual machine is obtained in the host according to the virtualization technology is not limited in the present disclosure. In this embodiment of the present disclosure, an example in which a host includes a virtual machine may be used for description.

The plurality of types of logical volumes in this embodiment of the present disclosure include a local storage volume, a distributed storage volume, and a hybrid storage volume. There is a correspondence between each type of logical volume and scheduling information of the data, the scheduling information may be used to indicate a quantity of copies of the data and a storage resource of the data, and the storage resource may be understood as a storage location of the data. The storage resource includes the local storage device and the distributed storage pool. The storage management device may use a distributed hash table (DHT) routing data algorithm to implement addressing and storage of to-be-written data on each storage node in the distributed storage pool.

The following describes the plurality of types of logical volumes according to different storage resources using an example. For example, the logical volumes include a local storage volume, a distributed storage volume, and a hybrid storage volume. A copy quantity and a storage resource corresponding to each type of logical volume are shown in Table 1:

TABLE 1

| Volume type | Scheduling information | |
|---|---|---|
| | Copy quantity | Storage resource |
| Local storage volume | First copy (for example, a quantity is one) | Local storage device |
| Distributed storage volume | Second copy (for example, a quantity is three) | Distributed storage pool |
| Hybrid storage volume | Third copy (for example, a quantity is three) | A storage resource corresponding to one copy is the local storage device, and a storage resource corresponding to the other two copies is the distributed storage pool. |

It may be learned from Table 1 that, for the local storage volume, the storage location of the data is configured as the local storage device, and the corresponding copy quantity is a quantity of first copies. For example, the quantity of first copies may be one.

For the distributed storage volume, the storage location of the data is configured as the distributed storage pool. The corresponding copy quantity is a quantity of second copies. For example, the quantity of second copies may be three.

For the hybrid storage volume, the corresponding copy quantity is a quantity of third copies, and the quantity of third copies is an integer greater than or equal to 2. The storage location of the data is the local storage device. To improve data security, another copy may be stored into the distributed storage pool. For example, a storage location of one copy of the data is configured as the local storage device, a storage location of N copies is configured as the distributed storage pool, and N is obtained by subtracting 1 from the quantity of third copies.

It should be noted that the three different types of logical volumes, and the copy quantity and the storage resource corresponding to each type of logical volume in Table 1 are described using an example, instead of being restrictively described. In actual application, a type of logical volume, a corresponding copy quantity, and a corresponding storage resource may be correspondingly configured according to different application scenarios and actual requirements. This is not limited in the present disclosure.

In this embodiment of the present disclosure, because the plurality of types of logical volumes are mounted onto the virtual machine, the storage management device may perform a corresponding operation on the to-be-written data according to scheduling information corresponding to different types of logical volumes. Therefore, the present disclosure can be more flexibly applied to a plurality of application scenarios, such as a desktop cloud scenario and a big data scenario.

Big data may be data accumulated by an enterprise, data generated by a social medium, or data collected by a sensing device. Because of a large data amount, the big data is more suitable for being stored in a local storage area. In comparison with distributed storage and external storage, network overheads are greatly reduced in order to meet a requirement for a high throughput of the big data, to reduce a delay, and to improve data processing efficiency. Therefore, the local storage volume may be used as a data storage volume.

Desktop cloud can provide a hosted desktop service for an enterprise user. The desktop cloud accesses a data center using network access and implements remote access, to provide a flexible data processing capability for an enterprise. In a working environment of some enterprises, a staff always needs to simultaneously use a plurality of desktop systems. Commonly, different enterprise service systems cannot be installed in a same desktop environment. A hosted desktop system provided by the desktop cloud allows a user to simultaneously access different background desktop systems in a browser screen, and can flexibly switch between different systems. Therefore, there are a relatively large quantity of times of read/write operations. In the desktop cloud application scenario, a high I/OPS requirement of the desktop cloud is met such that data is more suitable for distributed storage. Therefore, the distributed storage volume may be used as an operating system volume.

In this embodiment of the present disclosure, the desktop cloud application scenario and the big data application scenario may be used as an example for description. However, in actual application, the present disclosure is not limited to the two application scenarios.

A first host is one of the plurality of hosts, and the first host is provided with a first storage management device. In this embodiment of the present disclosure, the first host and the first storage management device are used as an example for description. The host in this embodiment of the present disclosure is the "first host". The storage management device in this embodiment of the present disclosure is the "first storage management device". The virtual machine in this embodiment of the present disclosure is a virtual machine in the first host. This is not explained repeatedly in the following.

Figure 2:
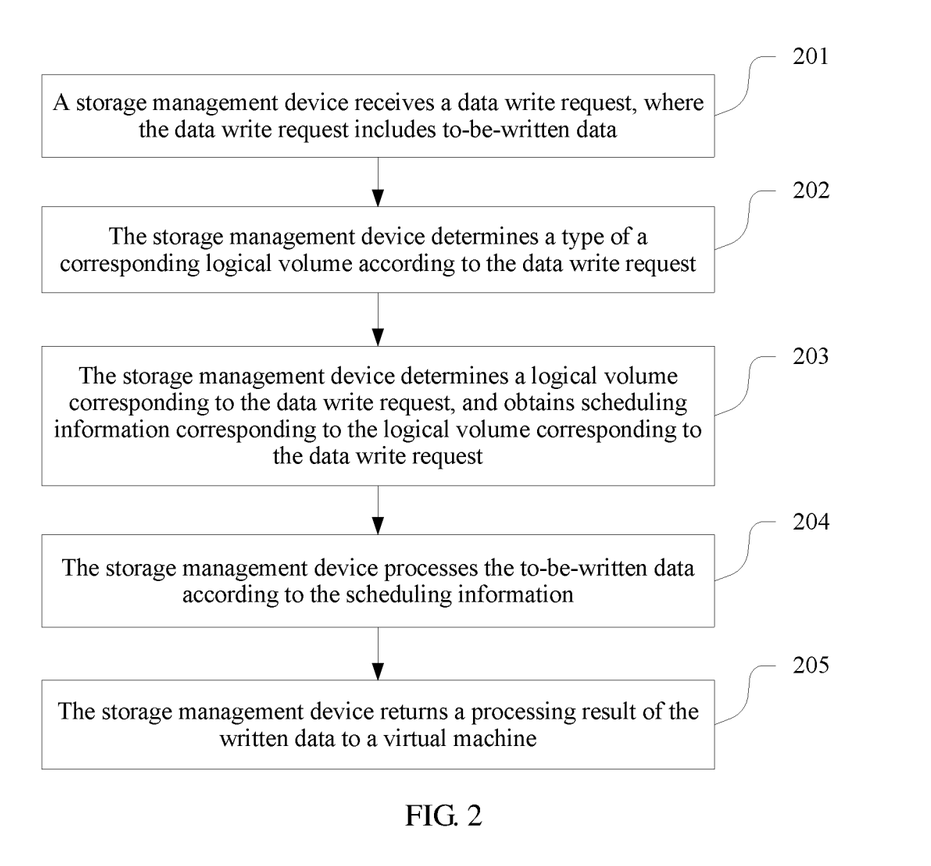
FIG. 2 is a schematic diagram of an embodiment of a data processing method according to the embodiments of the present disclosure.

When a host or a virtual machine receives a data processing request from a user, a storage management device of the host may determine scheduling information according to a type of logical volume, and then perform corresponding processing on data according to the scheduling information. Referring to FIG. 2, the embodiments of the present disclosure provide an embodiment of a data scheduling method, and the method includes the following steps.

Step 201: A storage management device receives a data write request, where the data write request includes to-be-written data.

In this embodiment of the present disclosure, a host generates a virtual machine, the virtual machine generates the data write request, and the virtual machine sends the data write request to the storage management device. The storage management device receives the data write request, and the data write request includes the to-be-written data. A reserved field and a newly added field of the data write request may carry volume information, there is a correspondence between the volume information and different types of logical volumes, and the volume information is used to indicate a type of logical volume. For example, the volume information may be meta information of a volume, and the meta information is description information of different types of logical volumes. Further, the volume information may be a logical address of the different types of volumes, or may be an index corresponding to the different types of logical volumes.

Optionally, the data write request may further carry a data amount of the to-be-written data, and the data amount of the to-be-written data is a size of data that needs to be written. For example, the data amount may be 1 terabyte (TB), 10 TB, or 15 TB.

Step 202: The storage management device determines a type of a corresponding logical volume according to the data write request.

In this embodiment of the present disclosure, the different types of logical volumes may be a local storage volume, a distributed storage volume, and a hybrid storage volume.

In a possible implementation, when the data write request carries the volume information, the storage management device may determine the type of the logical volume according to the volume information.

In another possible implementation, when the data write request carries the data amount of the to-be-written data, the storage management device dynamically determines the type of the volume according to the data amount. For example, a correspondence between the data amount and the type of the logical volume is as follows.

TABLE 2

| Data amount | Volume type |
| --- | --- |
| a ≤ first threshold | Distributed storage volume |
| First threshold < a ≤ second threshold | Hybrid storage volume |
| a > second threshold | Local storage volume |

As shown in Table 2, a is a data amount, and when the data amount is less than or equal to the first threshold, and the first threshold may be 1 TB, the storage management device determines, according to the data amount of the to-be-written data, that the type of the volume is the distributed storage volume. When the data amount is greater than the first threshold and is less than or equal to the second threshold, and the second threshold may be 10 TB, the storage management device determines, according to the data amount, that the type of the volume is the hybrid storage volume. When the data amount is greater than the second threshold, the storage management device determines, according to the data amount, that the type of the logical volume is the local storage volume. In this embodiment of the present disclosure, the storage management device dynamically determines the type of the logical volume according to the data amount of the to-be-written data such that the type of the logical volume can be dynamically determined according to features of different application scenarios, thereby enhancing adaptability and practicability of the storage system. It should be noted that the foregoing threshold is merely an example for description, but is not restrictively described. In actual application, this is not limited in the present disclosure.

In this embodiment of the present disclosure, the type of the logical volume can be flexibly determined according to the data amount of the to-be-written data, and the scheduling information is further flexibly determined such that data storage flexibility is greatly improved, and data storage adaptability is higher.

In another possible implementation, the storage management device determines, according to load information of a local storage device of the host and load information of a distributed storage pool, a logical volume corresponding to the data write request.

The load information is an amount of data stored in a storage resource, a data distribution status, and the like. For example, the local storage device includes an area in which data is stored and an area in which no data is stored. When the storage management device learns that a size of the area in which data is stored already exceeds the first threshold, the storage management device determines that the type of the volume is the distributed storage volume, and stores the data in the distributed storage pool, or when the type of the logical volume is the hybrid storage volume, the storage management device writes one copy of the data into the local storage area, and writes two other copies of the data into the distributed storage pool.

In this embodiment of the present disclosure, the type of the volume can be flexibly determined according to the load information of the storage resource, that is, the type of the logical volume can be flexibly determined, and the scheduling information is further flexibly determined such that data storage flexibility is greatly improved.

Step 203: The storage management device determines a logical volume corresponding to the data write request, and obtains scheduling information corresponding to the logical volume corresponding to the data write request.

The storage management device determines, according to a type of the logical volume and the correspondence (as shown in Table 1), the scheduling information corresponding to the logical volume. The three types of logical volumes in Table 1 are used as an example for description. If the storage management device determines that the type of the logical volume is the local storage volume, scheduling information corresponding to the local storage volume may be that a quantity of copies of the to-be-written data is one, and a storage location of the to-be-written data is the local storage device. For example, a quantity of copies of an upper-layer application is three. In this case, a total quantity of copies of the to-be-written data is three (1×3=3). However, in a conventional manner, if a quantity of copies of the upper-layer application is also three, a quantity of copies in conventional distributed storage is three, and a total quantity of copies of the data is nine (3×3=9).

In this embodiment of the present disclosure, compared with the quantity of copies of the data in the conventional manner, the quantity of copies of the data corresponding to the local storage volume is effectively reduced such that resources are greatly saved, and data reliability is not reduced. A copy of the upper-layer application may be used as assurance such that write performance is effectively improved, to avoid resource waste in data storage.

If the storage management device determines that the type of the logical volume is the distributed storage volume, scheduling information corresponding to the distributed storage volume may be that the quantity of copies of the to-be-written data is three, and the storage location of the data is the distributed storage pool.

If the storage management device determines that the type of the logical volume is the hybrid storage volume, scheduling information corresponding to the hybrid storage volume may be that the copy quantity is three, a storage resource corresponding to one copy is the local storage device, and a storage resource corresponding to the other two copies of the data is the distributed storage pool.

Step 204: The storage management device processes the to-be-written data according to the scheduling information.

The storage management device correspondingly writes the data into the storage resource according to the scheduling information. For example, the storage management device correspondingly writes the data into the local storage device of the host according to the scheduling information corresponding to the local storage volume. Alternatively, the storage management device may first write the data into a distributed storage device in the distributed storage pool according to the scheduling information corresponding to the distributed storage volume, then duplicate the data, and send the duplicated copy to another distributed storage device in the distributed storage pool for storage. For data security, a plurality of copies of the to-be-written data is written into distributed storage devices of different hosts. Alternatively, the storage management device writes one copy of the to-be-written data into the local storage device according to the scheduling information corresponding to the hybrid storage volume, and writes a copy that is of the data and whose quantity is a value obtained by subtracting 1 from the quantity of third copies into the distributed storage pool.

Step 205: The storage management device returns a processing result of the to-be written data to a virtual machine.

In this embodiment of the present disclosure, a plurality of types of volumes are mounted onto the virtual machine, and there is a correspondence between the plurality of types of volumes and scheduling information. The storage management device may determine the type of the logical volume according to the data write request, and further determine the scheduling information according to different types of logical volumes. The storage management device writes the data into a corresponding storage resource according to the scheduling information. This embodiment of the present disclosure can support a plurality of application scenarios, and is adaptable and flexible such that not only a high I/OPS requirement can be met, but requirements for a high throughput and for saving a network resource can be met.

The embodiments of the present disclosure provide another embodiment of a data scheduling method. In this embodiment of the present disclosure, a logical volume is mounted onto a host or a virtual machine, and a specific type of the logical volume may not be distinguished. A storage management device receives a data write request generated by the host, and the data write request includes to-be-written data. The storage management device first stores the to-be-written data into the logical volume, and then the storage management device may dynamically determine scheduling information according to the data write request. The scheduling information indicates that a storage resource is a local storage device and/or a distributed storage pool. Optionally, the scheduling information further includes a quantity of copies of the to-be-written data. The storage management device processes the to-be-written data according to the corresponding scheduling information. For understanding, refer to Table 3.

TABLE 3

| | Scheduling information | |
|---|---|---|
| | Copy quantity | Storage resource |
| Logical volume | Fourth copy | Local storage device and/or distributed storage pool |

It should be noted that a quantity of fourth copies in the foregoing table is flexibly set according to a storage resource, and the quantity of fourth copies may vary according to different storage resources. For example, when the storage resource indicated by the scheduling information is the local storage device, there may be two fourth copies, or when the storage resource indicated by the scheduling information is the distributed storage pool, there may be three fourth copies.

Figure 3:
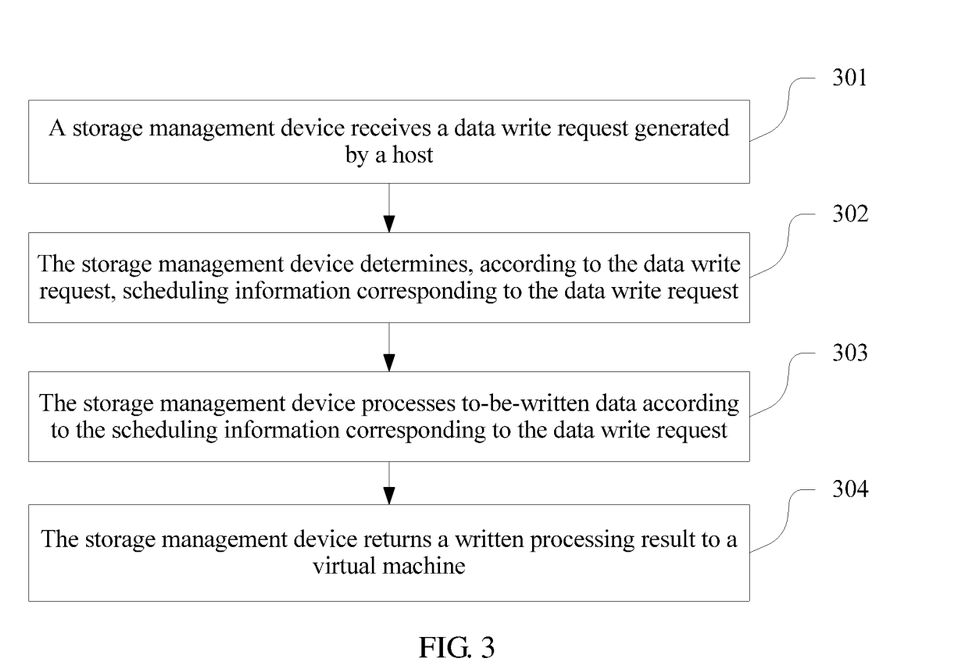
FIG. 3 is a schematic diagram of another embodiment of a data processing method according to the embodiments of the present disclosure.

The following further describes another embodiment of a data processing method. Referring to FIG. 3, this embodiment includes the following steps.

Step 301: A storage management device receives a data write request generated by a host.

The data write request includes to-be-written data. The data write request may further carry a data amount of the to-be-written data, and the data amount of the to-be-written data is a size of the to-be-written data. For example, the data amount may be 1 TB, 10 TB, or 15 TB.

Step 302: The storage management device determines, according to the data write request, scheduling information corresponding to the data write request.

In a possible implementation, the storage management device determines the scheduling information according to the data amount carried in the data write request. For example, a correspondence between a data amount and scheduling information is shown in Table 4.

TABLE 4

| | Scheduling information | |
|---|---|---|
| Data amount | Copy quantity | Storage resource |
| a ≤ 1 | 2 | Local storage device |
| 1 < a ≤ 10 | 3 | Distributed storage pool |
| a > 10 | 3 | A storage resource corresponding to one copy of the to-be-written data is the local storage device, and a storage resource corresponding to the other two copies is the distributed storage pool. |

As shown in Table 3, a is a data amount. When the data amount is less than or equal to a first threshold, and the first threshold may be 1 TB, the scheduling information determined by the storage management device according to the data amount of the to-be-written data is that the corresponding copy quantity two, and the corresponding storage resource is the local storage device.

When the data amount is greater than the first threshold and is less than or equal to a second threshold, and the second threshold may be 10 TB, the scheduling information determined by the storage management device according to the data amount is that the corresponding copy quantity is three, and the corresponding storage resource is the distributed storage pool.

When the data amount is greater than the second threshold, the scheduling information determined by the storage management device according to the data amount is that the quantity of copies of the data is three, the storage resource corresponding to one copy is the local storage device, and the storage resource corresponding to the other two copies of the data is the distributed storage pool.

It should be noted that the foregoing threshold is merely an example for description, but is not restrictively described. In actual application, this is not limited in the present disclosure.

In another possible implementation, the storage management device obtains load information of the local storage device and load information of the distributed storage pool according to the data write request. The load information is an amount of data stored in a storage resource, a data distribution status, and the like. A specific method for obtaining the load information of the local storage device and the load information of the distributed storage pool by the storage management device may be as follows.

(1) The storage management device records a data amount of written data and a storage resource (the local storage device and/or the distributed storage pool) of the data each time the data is written into, and when receiving the data write request again, the storage management device may determine the load information of the storage device and the load information of the distributed storage pool according to recorded historical information.

(2) The storage management device further includes a local management device and a distributed management device. The local management device is configured to manage a data storage status of the local storage device, and the distributed management device is configured to manage a data storage status of the distributed storage pool. The storage management device obtains the load information of the local storage device from the local management device, and obtains the load information of the distributed storage pool from the distributed management device.

The storage management device determines the scheduling information according to the obtained load information of the local storage device and the obtained load information of the distributed storage pool. A specific method may be as follows. For example, the local storage device includes an area in which data is stored and an area in which no data is stored. When the storage management device determines that a size of the area in which data is stored already exceeds the first threshold, or when the storage management device determines that a sum of a size of the area in which data is stored and a data amount of to-be-written data already exceeds the second threshold, a storage resource corresponding to scheduling information that is determined by the storage management device is the distributed storage pool, and a corresponding copy quantity is three. For another example, when the storage management device determines that a size of the area that is of the local storage device and in which data is stored is greater than a third threshold, and an area that is of the distributed storage pool and in which data is stored is less than a fourth threshold, a storage resource corresponding to scheduling information that is determined by the storage management device is the distributed storage pool and the local storage device, a corresponding copy quantity is three, one copy of to-be-written data is written into the local storage device, and the other two copies of the to-be-written data are written into the distributed storage pool. It should be noted that the copy quantity and the corresponding storage resource in the load information are described using an example, instead of being restrictively described. In actual application, flexible configuration may be performed according to a specific application scenario and an actual application situation. This is not limited in the present disclosure.

Step 303: The storage management device processes to-be-written data according to the scheduling information corresponding to the data write request.

The scheduling information corresponding to the data write request further includes a quantity of fourth copies of the to-be-written data, and the quantity of fourth copies is an integer greater than or equal to 2. If a storage resource indicated by the scheduling information corresponding to the data write request is the local storage device, a copy that is of the to-be-written data and whose quantity is the quantity (for example, two) of fourth copies is stored into the local storage device. If the storage resource indicated by the scheduling information corresponding to the data write request is the distributed storage pool, a copy that is of the to-be-written data and whose quantity is the quantity (for example, three) of fourth copies is stored into the distributed storage pool. If the storage resource indicated by the scheduling information corresponding to the data write request is the local storage device and the distributed storage pool, the quantity of fourth copies is three, one copy of the to-be-written data is stored into the local storage device, and two copies of the to-be-written data are stored into the distributed storage pool.

Step 304: The storage management device returns a written processing result to a virtual machine.

In this embodiment of the present disclosure, the scheduling information may indicate that the storage location of the to-be-written data is the local storage device and/or the distributed storage pool. The storage management device dynamically determines, according to the data amount of the to-be-written data or "the load information of the local storage device and the load information of the distributed storage pool", the scheduling information corresponding to the data write request, and may process the to-be-written data according to the scheduling information. Therefore, storage flexibility of the to-be-written data is greatly improved such that the present disclosure can be more flexibly applied to a plurality of application scenarios.

Figure 4:
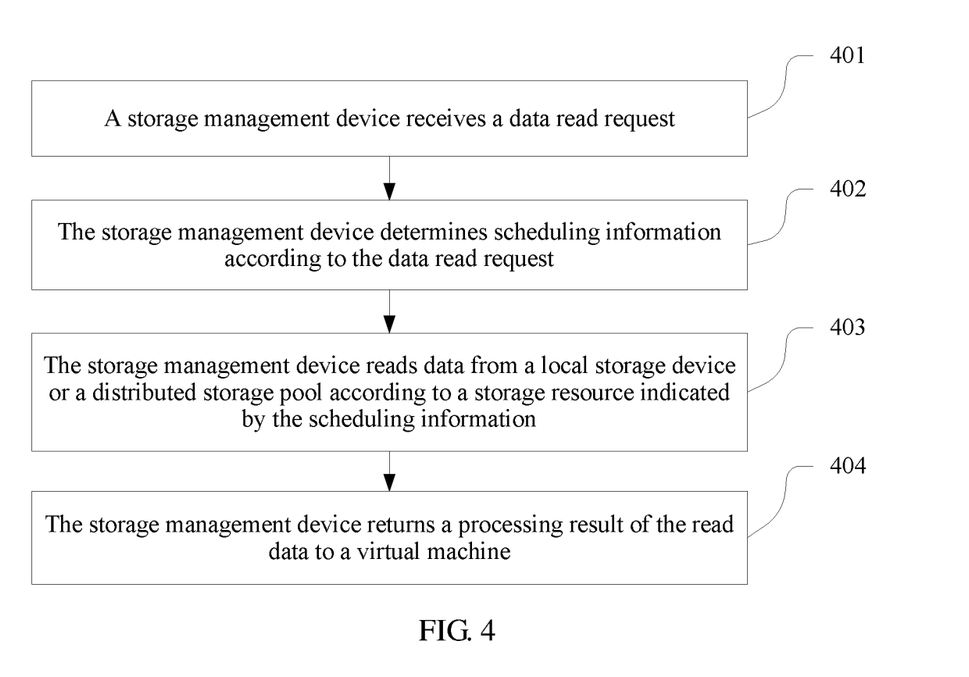
FIG. 4 is a schematic diagram of another embodiment of a data processing method according to the embodiments of the present disclosure.

FIG. 2 and FIG. 3 corresponding to embodiments of a data write process. Certainly, after data is written into a storage resource, other processing is further performed on the written data, such as data reading, data deletion, and data duplication. In the following, based on the embodiments corresponding to FIG. 2 and FIG. 3, the embodiments of the present disclosure further provide another embodiment of a data processing method. This embodiment of the present disclosure further describes a data reading process. Referring to FIG. 4, the other embodiment of the data processing method in the embodiments of the present disclosure includes the following steps.

Step 401: A storage management device receives a data read request.

A host generates a virtual machine, and when the virtual machine generates the data read request, the virtual machine sends the data read request to the storage management device. The storage management device receives the data read request. The data read request includes related information of to-be-read data, and the related information may be a file header of the to-be-read data, an index of the to-be-read data, a data amount of the to-be-read data, or the like.

Step 402: The storage management device determines scheduling information according to the data read request.

In a possible implementation, the storage management device may determine a type of a logical volume according to the related information in the data read request, and there is a correspondence between the type of the logical volume and the scheduling information. This may be understood with reference to step 202 in the embodiment corresponding to FIG. 2. The storage management device determines the scheduling information according to the type of the logical volume and the correspondence. A specific process may be understood with reference to step 203 in the embodiment corresponding to FIG. 2.

In another possible implementation, when data is written into a storage resource, the storage management device may record scheduling information corresponding to the data. Therefore, the storage management device may determine the scheduling information of the to-be-read data according to the related information in the data read request. The scheduling information indicates that the to-be-read data is stored in a local storage device and/or a distributed storage pool.

Step 403: The storage management device reads data from a local storage device or a distributed storage pool according to a storage resource indicated by the scheduling information.

If the scheduling information indicates that the storage resource of the to-be-read data is the local storage device, the storage management device reads the data from the local storage device.

If the scheduling information indicates that the storage resource of the to-be-read data is the distributed storage pool, the storage management device reads the data from the distributed storage pool.

If the scheduling information indicates that the storage resource of the to-be-read data is the distributed storage pool and the local storage device, the storage management device may read the data from the local storage device.

Step 404: The storage management device returns a processing result of the read data to a virtual machine.

Figure 5:
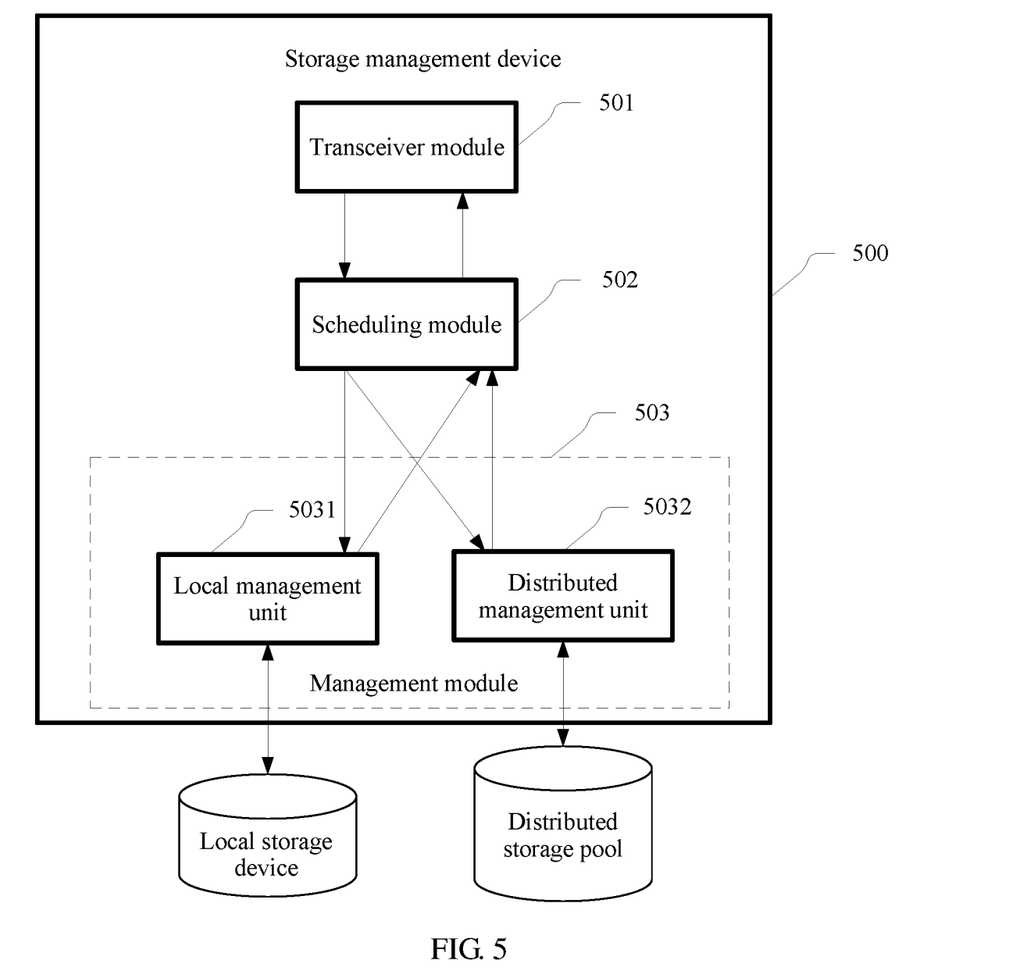
FIG. 5 is a schematic structural diagram of an embodiment of a storage management device according to the embodiments of the present disclosure.

The foregoing describes in detail a data processing method. The following further describes a storage management device corresponding to the method. Referring to FIG. 5, the present disclosure provides an embodiment of a storage management device 500, and the storage management device 500 includes a transceiver module 501, a scheduling module 502, and a management module 503.

The transceiver module 501 is configured to receive a data write request generated by a host. It may be understood that the transceiver module 501 may be a logical interface in the host or in a virtual machine.

The scheduling module 502 is configured to determine, according to the data write request received by the transceiver module, scheduling information corresponding to the data write request, where the data write request includes to-be-written data, and the scheduling information corresponding to the data write request indicates a distributed storage pool, or a local storage device of the host.

The management module 503 is configured to process the to-be-written data according to the scheduling information determined by the scheduling module corresponding to the data write request. Optionally, the storage management device 500 manages a plurality of types of logical volumes, the plurality of types of logical volumes include a local storage volume, a distributed storage volume, and a hybrid storage volume, and the storage management device 500 further stores scheduling information corresponding to each type of logical volume. Scheduling information corresponding to the local storage volume indicates the local storage device of the host, and scheduling information corresponding to the distributed storage volume indicates the distributed storage pool. Scheduling information corresponding to the hybrid storage volume indicates the local storage device of the host and the distributed storage pool. Optionally, to ensure data security, the scheduling information corresponding to the local storage volume further includes a quantity of first copies, the scheduling information corresponding to the distributed storage volume further includes a quantity of second copies, the scheduling information corresponding to the hybrid storage volume further includes a quantity of third copies, and the quantity of third copies is an integer greater than or equal to 2.

The scheduling module 502 is further configured to determine a logical volume corresponding to the data write request, and obtain scheduling information corresponding to the logical volume corresponding to the data write request.

Optionally, the management module 503 further includes a local management unit 5031 and a distributed management unit 5032.

The local management unit 5031 is configured to store a copy of the to-be-written data whose quantity is the quantity of first copies into the local storage device of the host when the scheduling information corresponding to the data write request indicates the local storage device of the host.

The distributed management unit 5032 is configured to store a copy of the to-be-written data whose quantity is the quantity of second copies into the distributed storage pool when the scheduling information corresponding to the data write request indicates the distributed storage pool.

When the scheduling information corresponding to the data write request indicates the local storage device of the host and the distributed storage pool, the local management unit 5031 stores one copy of the to-be-written data into the local storage device of the host, and the distributed management unit 5032 stores N copies of the to-be-written data into the distributed storage pool, where N is obtained by subtracting 1 from the quantity of third copies, and N is a positive integer.

Optionally, the scheduling module 502 is further configured to determine, according to a data amount of the to-be-written data, a logical volume corresponding to the data write request. The data write request carries the data amount of the to-be-written data.

Optionally, the scheduling module 502 is further configured to obtain load information of the local storage device of the host and load information of the distributed storage pool, and determine, according to the load information of the local storage device of the host and the load information of the distributed storage pool, the logical volume corresponding to the data write request.

Optionally, the scheduling module 502 is further configured to determine, according to a data amount of the to-be-written data, the scheduling information corresponding to the data write request.

Optionally, the scheduling module 502 is further configured to obtain load information of the local storage device of the host and load information of the distributed storage pool, and determine, according to the load information of the local storage device of the host and the load information of the distributed storage pool, the scheduling information corresponding to the data write request.

The management module 503 further includes the local management unit 5031 and the distributed management unit 5032.

The local management unit 5031 is configured to store a copy of the to-be-written data whose quantity is a quantity of fourth copies into the local storage device of the host when the scheduling information corresponding to the data write request indicates the local storage device of the host.

The distributed management unit 5032 is configured to store a copy of the to-be-written data whose quantity is the quantity of fourth copies into the distributed storage pool when the scheduling information corresponding to the data write request indicates the distributed storage pool.

When the scheduling information corresponding to the data write request indicates the local storage device of the host and the distributed storage pool, a local management storage unit 5031 stores one copy of the to-be-written data into the local storage device of the host, and a distributed management storage unit 5032 stores M copies of the to-be-written data into the distributed storage pool, where M is obtained by subtracting 1 from the quantity of fourth copies, and M is a positive integer.

Further, the transceiver module 501 is further configured to perform step 201, step 205, step 301, step 304, step 401, and step 404 in the embodiments corresponding to FIG. 2, FIG. 3, and FIG. 4. The scheduling module 502 is configured to perform step 202, step 203, step 302, and step 303 in the embodiments corresponding to FIG. 2, FIG. 3, and FIG. 4. The local management unit 5031 and the distributed management unit 5032 are configured to perform step 204, step 303, and step 403 in the embodiments corresponding to FIG. 2, FIG. 3, and FIG. 4. In this embodiment of the present disclosure, details are not described herein again.

Further, the storage management device in FIG. 5 is presented in a form of a function module. The "module" herein may be an application-specific integrated circuit (ASIC), a circuit, a processor and a memory that perform one or more software programs or firmware programs, an integrated logic circuit, and/or another component that can provide the foregoing function. In a simple embodiment, each module may be implemented using a host 600 in FIG. 6.

Figure 6:
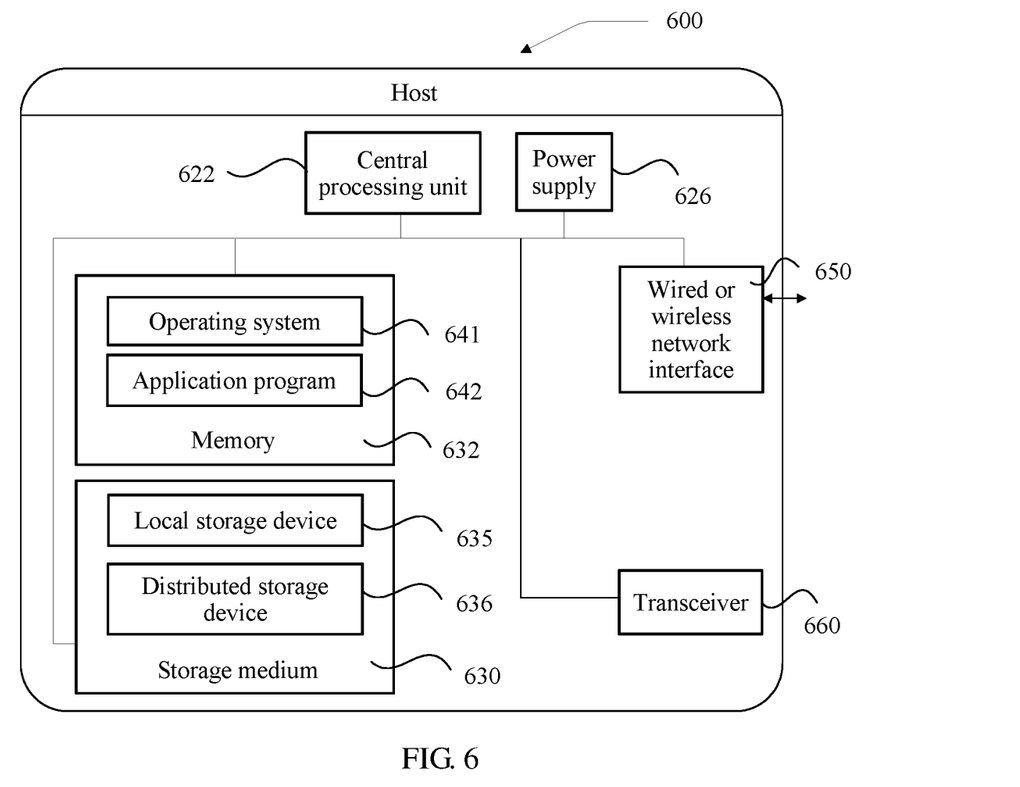
FIG. 6 is a schematic structural diagram of an embodiment of a host according to the embodiments of the present disclosure.

The host 600 may be an X86-server, a mainframe server, a midrange computer, or the like. FIG. 6 is a schematic structural diagram of a host according to an embodiment of the present disclosure. The host 600 may greatly vary because of different configurations or different performance. The host 600 may include one or more central processing units (CPUs) 622 (for example, one or more processors), one or more transceivers 660, one or more memories 632, and one or more storage application programs 642 or one or more storage mediums 630 (for example, one or more massive storage devices), and the storage medium 630 includes a local storage device 635 and a distributed storage device 636. The distributed storage device 636 forms a distributed storage pool shared by a plurality of hosts. The memory 632 may be constituted by a volatile storage medium, and the storage medium 630 may be constituted by a non-volatile storage medium. A program stored in the storage medium 630 may include one or more modules (which are not shown in the diagram), and each module may include a series of instruction operations performed on the host. Still further, the central processing unit 622 may be configured to communicate with the storage medium 630, and may perform, on the host 600, a series of instruction operations stored in the storage medium 632.

The host 600 may further include one or more power supplies 626, one or more wired or wireless network interfaces 650, and/or one or more operating systems 641, such as WINDOWS SERVER™, MACOS™, UNIX™, LINUX™, and FREEBSD™.

The steps performed by the storage management device in the foregoing embodiment may be based on a host structure shown in FIG. 6.

The central processing unit 622 executes a program instruction such that the host 600 performs the method performed by the storage management device in the embodiments corresponding to FIG. 2, FIG. 3, and FIG. 4.

It may be clearly understood by persons skilled in the art that, for the purpose of convenient and brief description, for a detailed working process of the foregoing storage system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated in another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated in one processing unit, or each of the units may exist alone physically, or two or more units are integrated in one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A data processing method implemented by a storage management device of a host, the data processing method comprising:
    managing a plurality of types of logical volumes, wherein the types comprise a local storage volume and a distributed storage volume;
    storing scheduling information corresponding to the local storage volume, wherein the local storage volume indicates a local storage device of the host;
    storing scheduling information corresponding to the distributed storage volume, wherein the distributed storage volume indicates a distributed storage pool;
    receiving a data write request;
    determining a logical volume corresponding to the data write request;
    obtaining scheduling information corresponding to the logical volume corresponding to the data write request, wherein the data write request comprises to-be-written data, and wherein the scheduling information corresponding to the data write request indicates the distributed storage pool or the local storage device; and
    processing the to-be-written data according to the scheduling information corresponding to the data write request.

2. The data processing method of claim 1, wherein the types further comprise a hybrid storage volume, wherein scheduling information corresponding to the hybrid storage volume indicates the local storage device and the distributed storage pool, wherein the scheduling information corresponding to the local storage volume further comprises a quantity of first copies, wherein the scheduling information corresponding to the distributed storage volume further comprises a quantity of second copies, wherein the scheduling information corresponding to the hybrid storage volume further comprises a quantity of third copies, wherein the quantity of third copies is an integer greater than or equal to two, and wherein processing the to-be-written data comprises storing a copy of the to-be-written data whose quantity comprises the quantity of first copies into the local storage device when the scheduling information corresponding to the data write request indicates the local storage device.

3. The data processing method of claim 1, wherein the types further comprise a hybrid storage volume, wherein scheduling information corresponding to the hybrid storage volume indicates the local storage device and the distributed storage pool, wherein the scheduling information corresponding to the local storage volume further comprises a quantity of first copies, wherein the scheduling information corresponding to the distributed storage volume further comprises a quantity of second copies, wherein the scheduling information corresponding to the hybrid storage volume further comprises a quantity of third copies, wherein the quantity of third copies is an integer greater than or equal to two, and wherein processing the to-be-written data comprises storing a copy of the to-be-written data whose quantity comprises the quantity of second copies into the distributed storage pool when the scheduling information corresponding to the data write request indicates the distributed storage pool.

4. The data processing method of claim 1, wherein the types further comprise a hybrid storage volume, wherein scheduling information corresponding to the hybrid storage volume indicates the local storage device and the distributed storage pool, wherein the scheduling information corresponding to the local storage volume further comprises a quantity of first copies, wherein the scheduling information corresponding to the distributed storage volume further comprises a quantity of second copies, wherein the scheduling information corresponding to the hybrid storage volume further comprises a quantity of third copies, wherein the quantity of third copies is an integer greater than or equal to two, and wherein processing the to-be-written data comprises:
    storing one copy of the to-be-written data into the local storage device when the scheduling information corresponding to the data write request indicates the local storage device and the distributed storage pool; and
    storing N copies of the to-be-written data into the distributed storage pool,
    wherein N is based on subtracting one from the quantity of third copies, and
    wherein N is a positive integer.

5. The data processing method of claim 1, wherein the data write request further carries a data amount of the to-be-written data, and wherein determining the logical volume corresponding to the data write request comprises determining, according to the data amount of the to-be-written data, the logical volume corresponding to the data write request.

6. The data processing method of claim 1, further comprising obtaining load information of the local storage device and load information of the distributed storage pool, wherein determining the logical volume corresponding to the data write request comprises determining, according to the load information of the local storage device and the load information of the distributed storage pool, the logical volume corresponding to the data write request.

7. The data processing method of claim 1, wherein the data write request further carries a data amount of the to-be-written data, and wherein determining the scheduling information corresponding to the data write request comprises determining, according to the data amount of the to-be-written data, the scheduling information corresponding to the data write request.

8. The data processing method of claim 1, further comprising obtaining load information of the local storage device and load information of the distributed storage pool, wherein determining the scheduling information corresponding to the data write request comprises determining, according to the load information of the local storage device and the load information of the distributed storage pool, the scheduling information corresponding to the data write request.

9. The data processing method of claim 1, wherein the scheduling information corresponding to the data write request further comprises a quantity of fourth copies of the to-be-written data, wherein the quantity of fourth copies is an integer greater than or equal to two, and wherein processing the to-be-written data comprises storing a copy of the to-be-written data whose quantity comprises the quantity of fourth copies into the local storage device when the scheduling information corresponding to the data write request indicates the local storage device.

10. The data processing method of claim 1, wherein the scheduling information corresponding to the data write request further comprises a quantity of fourth copies of the to-be-written data, wherein the quantity of fourth copies is an integer greater than or equal to two, and wherein processing the to-be-written data comprises storing a copy of the to-be-written data whose quantity comprises the quantity of fourth copies into the distributed storage pool when the scheduling information corresponding to the data write request indicates the distributed storage pool.

11. The data processing method of claim 1, wherein the scheduling information corresponding to the data write request further comprises a quantity of fourth copies of the to-be-written data, wherein the quantity of fourth copies is an integer greater than or equal to two, and wherein processing the to-be-written data comprises:
   storing one copy of the to-be-written data into the local storage device of the host when the scheduling information corresponding to the data write request indicates the local storage device and the distributed storage pool; and
   storing M copies of the to-be-written data into the distributed storage pool,
   wherein M is based on subtracting one from the quantity of fourth copies, and
   wherein M is a positive integer.

12. A first host comprising:
   a local storage device;
   a first distributed storage device coupled to the local storage device configured to form a distributed storage pool with a second distributed storage device of a second host; and
   a storage management device coupled to the local storage device and the first distributed storage device and configured to:
      manage a plurality of types of logical volumes, wherein the types comprise a local storage volume and a distributed storage volume;
      store scheduling information corresponding to the local storage volume, wherein the local storage volume indicates a local storage device of the host;
      store scheduling information corresponding to the distributed storage volume, wherein the distributed storage volume indicates a distributed storage pool:
      receive a data write request;
      determine a logical volume corresponding to the data write request;
      obtain scheduling information corresponding to the logical volume corresponding to the data write request, wherein the data write request comprises to-be-written data, and wherein the scheduling information corresponding to the data write request indicates the distributed storage pool or the local storage device; and
      process the to-be-written data according to the scheduling information corresponding to the data write request.

13. The first host of claim 12, wherein the types further comprise a hybrid storage volume, wherein scheduling information corresponding to the hybrid storage volume indicates the local storage device and the distributed storage pool, wherein the scheduling information corresponding to the local storage volume further comprises a quantity of first copies, wherein the scheduling information corresponding to the distributed storage volume further comprises a quantity of second copies, wherein the scheduling information corresponding to the hybrid storage volume further comprises a quantity of third copies, wherein the quantity of third copies is an integer greater than or equal to two, and wherein the storage management device is further configured to store a copy of the to-be-written data whose quantity comprises the quantity of first copies into the local storage device when the scheduling information corresponding to the data write request indicates the local storage device.

14. The first host of claim 12, wherein the types further comprise a hybrid storage volume, wherein scheduling information corresponding to the hybrid storage volume indicates the local storage device and the distributed storage pool, wherein the scheduling information corresponding to the local storage volume further comprises a quantity of first copies, wherein the scheduling information corresponding to the distributed storage volume further comprises a quantity of second copies, wherein the scheduling information corresponding to the hybrid storage volume further comprises a quantity of third copies, wherein the quantity of third copies is an integer greater than or equal to two, and wherein the storage management device is further configured to store a copy of the to-be-written data whose quantity comprises the quantity of second copies into the distributed storage pool when the scheduling information corresponding to the data write request indicates the distributed storage pool.

15. The first host of claim 12, wherein the types further comprise a hybrid storage volume, wherein scheduling information corresponding to the hybrid storage volume indicates the local storage device and the distributed storage pool, wherein the scheduling information corresponding to the local storage volume further comprises a quantity of first copies, wherein the scheduling information corresponding to the distributed storage volume further comprises a quantity of second copies, wherein the scheduling information corresponding to the hybrid storage volume further comprises a quantity of third copies, wherein the quantity of third copies is an integer greater than or equal to two, and wherein when the scheduling information corresponding to the data write request indicates the local storage device and the distributed storage pool, the storage management device is further configured to:
   store one copy of the to-be-written data into the local storage device; and
   store N copies of the to-be-written data into the distributed storage pool,
   wherein N is based on subtracting one from the quantity of third copies, and
   wherein N is a positive integer.

16. The first host of claim 12, wherein the data write request further carries a data amount of the to-be-written data, and wherein the storage management device is further configured to determine, according to the data amount of the to-be-written data, the logical volume corresponding to the data write request.

17. The first host of claim 12, wherein the storage management device is further configured to:
   obtain load information of the local storage device and load information of the distributed storage pool; and determine, according to the load information of the local storage device and the load information of the distributed storage pool, the logical volume corresponding to the data write request.

18. A computer program product comprising computer-executable instructions stored on a non-transitory computer-readable medium that, when executed by a processor, cause a storage management device of a host to:
- manage a plurality of types of logical volumes, wherein the types comprise a local storage volume and a distributed storage volume;
- store scheduling information corresponding to the local storage volume, wherein the local storage volume indicates a local storage device of the host:
- store scheduling information corresponding to the distributed storage volume, wherein the distributed storage volume indicates a distributed storage pool;
- receive a data write request;
- determine a logical volume corresponding to the data write request;
- obtain scheduling information corresponding to the logical volume corresponding to the data write request, wherein the data write request comprises to-be-written data, and wherein the scheduling information corresponding to the data write request indicates the distributed storage pool or the local storage device; and
- process the to-be-written data according to the scheduling information corresponding to the data write request.

19. The computer program product of claim 18, wherein the types further comprise a hybrid storage volume, wherein scheduling information corresponding to the hybrid storage volume indicates the local storage device of the host and the distributed storage pool, wherein the scheduling information corresponding to the local storage volume further comprises a quantity of first copies, wherein the scheduling information corresponding to the distributed storage volume further comprises a quantity of second copies, wherein the scheduling information corresponding to the hybrid storage volume further comprises a quantity of third copies, wherein the quantity of third copies is an integer greater than or equal to two, and wherein the instructions further cause the storage management device to store a copy of the to-be-written data whose quantity comprises the quantity of first copies into the local storage device of the host when the scheduling information corresponding to the data write request indicates the local storage device of the host.

20. The computer program product of claim 18, wherein the types further comprise a hybrid storage volume, wherein scheduling information corresponding to the hybrid storage volume indicates the local storage device of the host and the distributed storage pool, wherein the scheduling information corresponding to the local storage volume further comprises a quantity of first copies, wherein the scheduling information corresponding to the distributed storage volume further comprises a quantity of second copies, wherein the scheduling information corresponding to the hybrid storage volume further comprises a quantity of third copies, wherein the quantity of third copies is an integer greater than or equal to two, and wherein the instructions further cause the storage management device to store a copy of the to-be-written data whose quantity comprises the quantity of second copies into the distributed storage pool when the scheduling information corresponding to the data write request indicates the distributed storage pool.

* * * * *